United States Patent Office 3,084,998
Patented Apr. 9, 1963

3,084,998
METHOD OF MAKING FOAMED SILICON NITRIDE
Howard M. Dess, Niagara Falls, N.Y., assignor to Union Carbide Corporation, a corporation of New York
No Drawing. Filed Dec. 20, 1960, Ser. No. 77,011
4 Claims. (Cl. 23—191)

This invention relates to a foamed silicon nitride and to a process for the production of foamed silicon nitride.

Silicon nitride is well-known for its chemical inertness, thermal shock resistance, chemical stability at high temperature, hardness and relatively light weight as compared to most refractory materials. Commercially produced silicon nitride has a bulk density of approximately 150 pounds per cubic foot. While compared to structural materials this is relatively light it is not well-suited for thermal insulation purposes.

It is an object of the present invention to provide low density silicon nitride suitable for use as thermal insulation.

It is another object of the invention to provide a process for the production of said silicon nitride.

Other objects will be apparent from the subsequent disclosure and appended claims.

The process which satisfies the objects of the present invention comprises reacting aqueous hydrofluoric acid with finely-divided elemental silicon powder having an oxidic film, said finely-divided silicon powder being present in a substantial excess over that necessary for reaction with said hydrofluoric acid, whereby a stable foam is formed; drying the foam; and nitriding the foam to convert it to a porous structure comprising substantially pure silicon nitride.

As employed herein the term "stable foam" is used to designate a cellulated structure capable of supporting at least its own weight as distinguished from a froth which possesses little or no strength or permanency.

The exact mechanism for the formation of the foam is not certain. It is believed that silicon in the surface oxide layers of the silicon particles reacts with the hydrofluoric acid to evolve hydrogen and to produce silicon tetrafluoride in solution. It is further believed that the silicon tetrafluoride and the oxide film of silicon react with the hydrofluoric acid to produce, in solution, hydrous fluosilicic acid. It has been noted that when the surface layers of the silicon are removed, the underlying substrate is passivated, and reaction stops. It appears that the hydrogen evolved causes the foam formation and rise of foam in the container, to produce a cellulated structure wherein the cell walls are membranes of silicon particles cemented together with a film of hydrous fluosilicic acid.

Commercial grade silicon powder normally containing an exterior oxidic film is not only useful in the process of the present invention but, in fact, is quite superior in reactivity and foam formation and is considered to be far more desirable for the purposes of the present invention than silicon which has less external oxide contamination. The concentration of the hydrofluoric acid may vary from 1 to 100 percent although dilute aqueous hydrofluoric acid is superior. As employed herein "dilute aqueous hydrofluoric acid" refers to an acid having a concentration from about 1 percent up to about 20 percent and preferably about 10 percent. A ratio of silicon to acid solution of about 1:1 has been found preferable.

There is no criticality with respect to the sequence of combining the silicon and hydrofluoric acid. However, it may suitably be accomplished by adding the dilute acid to the dry powdered silicon in a suitable acid resistant container. An equally suitable method comprises forming an aqueous slurry of silicon powder and subsequently adding dilute acid to the slurry. When a slurry is employed anhydrous hydrofluoric acid may be employed by bubbling it through the slurry.

Upon the conclusion of foam formation the foam is permitted to dry. This may be accomplished by air drying at room temperature or by placing the foam mixture in a suitable drying oven. The source of silicon may be either pure silicon or a high silicon alloy such as ferrosilicon but as was stated previously it is preferred to use pure silicon having an oxidic film to obtain a refractory product in the most efficient manner.

For most efficient nitriding it is recommended that the maximum particle size of the silicon be about 150 mesh for complete nitriding. Less coarse material is more suitable to obtain a product having finer pores. However, in determining the desirable particle size of the silicon the ratio of the diameter of the silicon particle to the thickness of the cell wall of the cellulated or foamed silicon product must be considered. It has been found, therefore, that for efficient nitriding as well as for the formation of a strong cellulated structure the silicon powder should have a maximum particle size of 400 mesh.

Any suitable technique for nitriding may be employed. One method comprises heating the foamed material in a carbon resistor electric furnace to the nitriding temperature while passing substantially pure nitrogen gas through the furnace. Nitriding begins at about 1100° C.; the temperature is raised steadily until a final temperature of about 1500° C. is reached at which time the reaction is completed. The resulting product is substantially pure silicon nitride characterized by a plurality of adjacent spaces or voids resembling a solidified foaming mass.

Detailed examination of the silicon nitride product revealed that the cell walls are lined with mats of fine fibrous silicon nitride which further enhances the thermal insulation properties. The bulk density of the product may run well below 20 pounds per cubic foot as compared to 150 pounds per cubic foot for commercial silicon nitride. Immersion of the product in boiling water for a period of about one hour will cause no apparent change in the material which readily floats. The foamed silicon nitride product is very strong as compared to the original silicon foam.

In fabricating articles from the material of the present invention, it is most advantageous to form them of the dried silicon foam prior to nitriding. The dried foamed silicon can be readily cut into any convenient shapes and is easily handled. Upon nitriding the shapes then become relatively hard and rigid.

In an example of the invention a silicon foam was prepared by treating 70 grams of through 400 mesh silicon powder with 300 milliliters of 10 percent hydrofluoric acid solution. The reaction was started by adding the acid solution to the dry silicon powder in a polyethylene container. The resulting foam was air dried and then nitrided by heating it for 5 hours in the temperature range of 1100° C. to 1450° C. in an atmosphere consisting of a gas mixture of 95 percent nitrogen-5 percent hydrogen. At the conclusion of the heating the originally black fragile silicon foam had been converted to a blue-gray strong product which X-ray analysis showed to be alpha silicon nitride ($\alpha$-$Si_3N_4$). The bulk density of the product was 18.5 pounds per cubic foot.

What is claimed is:
1. A process for the production of porous silicon nitride comprising mixing finely-divided silicon having an oxidic silicon film, with aqueous hydrofluoric acid, the amount of finely-divided silicon being substantially in excess of that which will react with said hydrofluoric acid, whereby a stable foam is formed; drying said foam; and nitriding the foam to convert it to substantially pure silicon nitride.

2. A process in accordance with claim 1 wherein said aqueous hydrofluoric acid has a concentration in the range of from about 1 percent up to about 20 percent.

3. A process for the production of porous silicon nitride comprising mixing finely-divided silicon having an oxidic silicon film and a maximum particle size of through 400 mesh with aqueous hydrofluoric acid having a concentration in the range of from about 1 percent up to about 20 percent, the amount of finely-divided silicon being substantially in excess of that which will react with said hydrofluoric acid, whereby a stable foam is formed; drying said foam; and heating the dried foam in a nitrogenous atmosphere at a temperature in the range of from about 1100° C. up to about 1500° C. until the foam is converted to substantially pure silicon nitride.

4. A process in accordance with claim 2 wherein the hydrofluoric acid has a concentration of about 10 percent and wherein the ratio of silicon to acid solution is about 1 to 1.

References Cited in the file of this patent

UNITED STATES PATENTS 2,618,565    Nicholson _____ Nov. 18, 1952